United States Patent
Kirzhner et al.

(10) Patent No.: US 8,355,819 B2
(45) Date of Patent: Jan. 15, 2013

(54) METHOD, APPARATUS AND SYSTEM FOR IGNITING WIDE RANGE OF TURBINE FUELS

(75) Inventors: Joseph Kirzhner, Greenvile, SC (US); Matthieu Paul Frederic Vierling, Dampierre les Bois (FR); Nicolas Pourron, Belfort (FR); Denis Michel Martin, Vieux Charmont (FR)

(73) Assignee: General Electric Company, Schenectady, NY (US)

( * ) Notice: Subject to any disclaimer, the term of this patent is extended or adjusted under 35 U.S.C. 154(b) by 35 days.

(21) Appl. No.: 12/898,154

(22) Filed: Oct. 5, 2010

(65) Prior Publication Data

US 2012/0079831 A1    Apr. 5, 2012

(51) Int. Cl.
- *G05B 19/00* (2006.01)
- *G05B 21/00* (2006.01)
- *G01N 31/00* (2006.01)
- *F02C 7/22* (2006.01)
- *F02C 7/26* (2006.01)
- *F02C 9/26* (2006.01)

(52) U.S. Cl. ............ 700/274; 700/260; 702/22; 702/23; 60/790

(58) Field of Classification Search .................. 700/274, 700/266; 436/55, 137, 143; 422/62, 105; 702/22

See application file for complete search history.

(56) References Cited

U.S. PATENT DOCUMENTS

| | | | |
|---|---|---|---|
| 3,729,929 A | 5/1973 | Kiscaden | |
| 5,103,629 A | 4/1992 | Mumford et al. | |
| 5,237,812 A | 8/1993 | Mumford | |
| 5,907,949 A | 6/1999 | Falke et al. | |
| 6,148,603 A | 11/2000 | Althaus | |
| 6,535,096 B1 | 3/2003 | Rapoport et al. | |
| 6,640,548 B2 | 11/2003 | Brushwood et al. | |
| 6,810,676 B2 | 11/2004 | O'Connor | |
| 6,872,071 B1* | 3/2005 | Durst ............................. | 431/90 |
| 7,472,540 B2 | 1/2009 | Berenbrink et al. | |
| 7,472,541 B2* | 1/2009 | Takeda et al. ............... | 60/39.465 |
| 2003/0093184 A1* | 5/2003 | Tanaka .......................... | 700/289 |
| 2007/0101724 A1* | 5/2007 | Gadde et al. .................... | 60/773 |
| 2007/0113560 A1* | 5/2007 | Steber et al. .................... | 60/773 |
| 2008/0115482 A1 | 5/2008 | LaGrow et al. | |

* cited by examiner

*Primary Examiner* — Jill Warden
*Assistant Examiner* — Charles D Hammond
(74) *Attorney, Agent, or Firm* — Nixon & Vanderhye P.C.

(57) ABSTRACT

In operating a gas turbine, there can be a difference between the desired heating value of the fuel and the actual needs of the fuel for the supplied fuel to be ignited. In one aspect, fuel parameters related to the molecular weight of the fuel such as specific gravity and pressure drop are determined. Ignitability of the fuel is calculated based on the fuel parameters and adjusted as necessary to bring the fuel's ignitability to designed values. The fuel's ignitability can be calculated without actually igniting the fuel and also without direct knowledge of the fuel's calorific value or its composition.

24 Claims, 4 Drawing Sheets

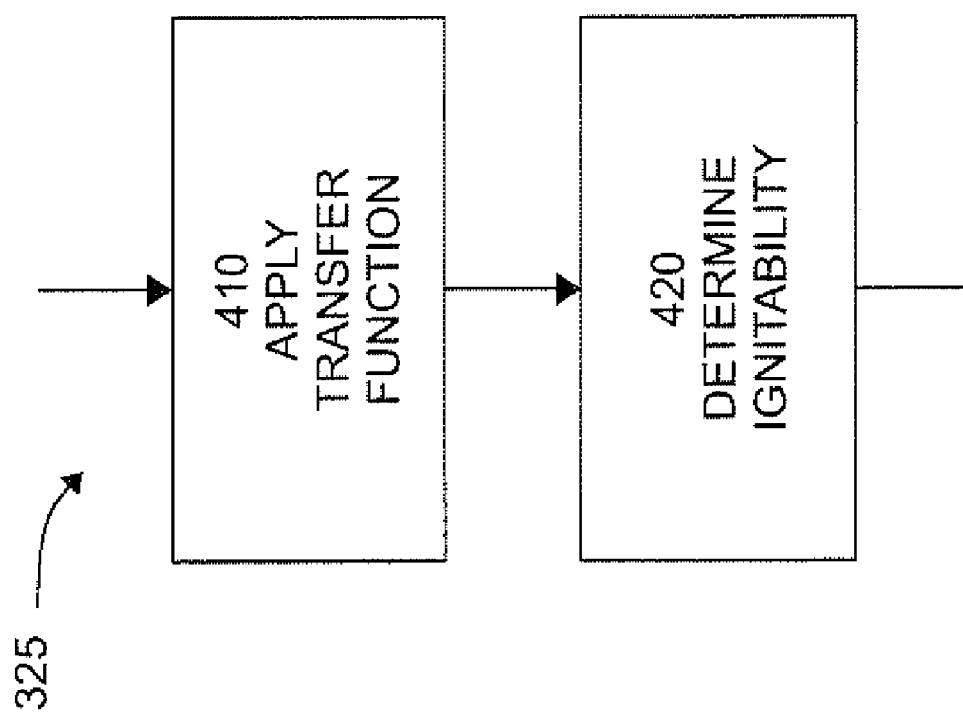

METHOD, APPARATUS AND SYSTEM FOR IGNITING WIDE RANGE OF TURBINE FUELS

One or more aspects of the present invention relate to method, apparatus and system for igniting a wide quality range of fuels for combustion in a gas turbine.

BACKGROUND OF THE INVENTION

Starting, i.e. igniting, a gas turbine can be a complex process, but can be described generally as including the following steps. First, the turbine is ventilated so as to remove any fuel that may still be in the combustion chamber, the turbine assembly, or in the turbine piping. Then the turbine is rotated until a desired compression is reached, at which point, the turbine fuel is introduced and ignited. After the ignition, load is connected. One of the reasons for ventilating before the turbine is rotated is to prevent unwanted ignition or combustion before the desired compression is reached.

Improper ignition can lead to delay in reaching proper operating levels and also can lead to damages. Even worse, if too much fuel is delivered and present, there is a risk of explosion. Whether there is too much or not enough fuel depends, at least in part, on the heat value or flammability of the fuel, and fuel-air mixture properties. A fuel-to-air ratio for one fuel may be too much due to the high flammability of the fuel, while the same fuel-to-air ratio for a low flammability fuel may not be enough for ignition.

Due to market fluctuations, it is often beneficial for an operator to operate the gas turbine using different types of turbine fuels. Thus, the fuel gas characteristics may not be known when the gas turbine is to be turned on for operation. When the fuel gas characteristics are not known at the time of the turbine ignition, a conservative approach is taken to ignite the turbine for safety reasons.

In the conservative approach, multiple ignition attempts are the norm. Initially, a very low fuel-to-air mixture is provided to minimize risk of explosion and the ignition is attempted. If the attempt is unsuccessful, the turbine system is ventilated. Then the parameters are changed such as increasing the fuel-to-air ratio, increasing the turbine speed, changing fuel and/or air, or flow, and so on and another ignition attempt is made. This process is repeated until the turbine is successfully ignited.

The process followed to ignite the turbine when the fuel gas characteristics are unknown can be generally described as assuming the worst case, and incrementally changing the ignition parameters until the successful ignition occurs. Unfortunately, multiple ignition attempts take time, i.e. causes delay. Also, multiple attempts increase wear and tear on the turbine.

On the other hand, if the fuel gas composition is known, then the number of ignition attempts can be reduced, down to a single attempt in some instances. For example, the fuel gas supplier may provide this information. When the fuel gas composition is known, then the ignition parameters may be determined more precisely. Reducing the number of ignition attempts enables the turbine to reach operation levels quicker and also reduces wear and tear. However, it is not always possible for the supplier to provide the information.

Another way is to include sensing devices to measure the fuel gas characteristics. In the US Patent Publication 2008/0115482 issued to LaGrow et al., a gas turbine engine that includes an integrated fuel characterization system is disclosed. The integrated fuel gas characterization system determines the amount of energy provided by the fuel prior to combustion of the fuel in the combustion stage. According to LaGrow et al., the integrated fuel gas characterization system provides improved turbine engine start-up reliability by tuning the turbine engine operating parameters using fuel gas energy content measurements obtained prior to actual start-up.

In LaGrow et al., either a Wobbe meter or a gas chromatograph is provided upstream of the turbine's combustion chamber. In this way, the Wobbe index or the fuel gas composition can be measured before the fuel gas is combusted in the gas turbine. Based on the measured Wobbe index or the fuel gas composition, the turbine's operating parameters are tuned so that by the time the measured gas enters the combustion chamber, proper adjustments are made. To allow time for sufficient measurements to take place and operating parameters be adjusted, a buffer tank is provided.

Sensing devices such as the Wobbe meter, gas chromatograph, and calorimeter allow for faster ignition by reducing the number of attempts, but these types of sensing devices are expensive. Adding to the cost is that often, the sensors are repeated for redundancy so as to provide some margin of safety. For existing turbine systems that are without these sensors, upgrading these systems with the sensors can represent a significant cost increase and service disruption. Another disadvantage is that the sensing devices may not always be reliable.

Thus, it is desirable to reduce the number of gas turbine ignition attempts even when the fuel gas characteristics are unknown without requiring such sensing devices.

BRIEF SUMMARY OF THE INVENTION

A non-limiting aspect of the present invention relates to a method for delivering fuel-air mixture to a gas turbine for ignition. The fuel can comprise a composition of one or more fuel components. In the method, an ignitability of the mixture may be calculated based on one or more fuel parameters related to molecular weight of the fuel, one or more fuel flow parameters, and one or more oxidizer flow parameters. Then the fuel and oxidizer in the mixture may be adjusted such that the ignitability of the mixture after the adjustment is within a reference ignitability range. The step of calculating the ignitability of the mixture and the step of adjusting the fuel and oxidizer mixture are performed before igniting the mixture.

Another non-limiting aspect of the present invention relates to a controller for controlling delivery of fuel and oxidizer mixture to a gas turbine for ignition. The fuel can comprise a composition of one or more fuel components. The controller may include a parameter receiving unit arranged to receive any combination of on one or more fuel parameters related to molecular weight of the fuel, one or more fuel flow parameters, and one or more oxidizer flow parameters. The controller may also include an ignitability calculating unit arranged to calculate an ignitability of the mixture based on parameters received by the parameter receiving unit. The controller may further include an ignitability adjusting unit arranged to adjust the fuel and oxidizer in the mixture such that the ignitability of the mixture after the adjustment is within a reference ignitability range. The ignitability calculating unit and the ignitability adjusting unit may both perform their respective calculations and adjustments before the mixture is ignited.

The invention will now be described in greater detail in connection with the drawings identified below.

BRIEF DESCRIPTION OF THE DRAWINGS

These and other features of the present invention will be better understood through the following detailed description of example embodiments in conjunction with the accompanying drawings, in which:

FIG. 4 illustrates a flow chart of an example process for determining ignitability indicators according to a non-limiting aspect of the present invention;

DETAILED DESCRIPTION OF THE INVENTION

Figure 1:
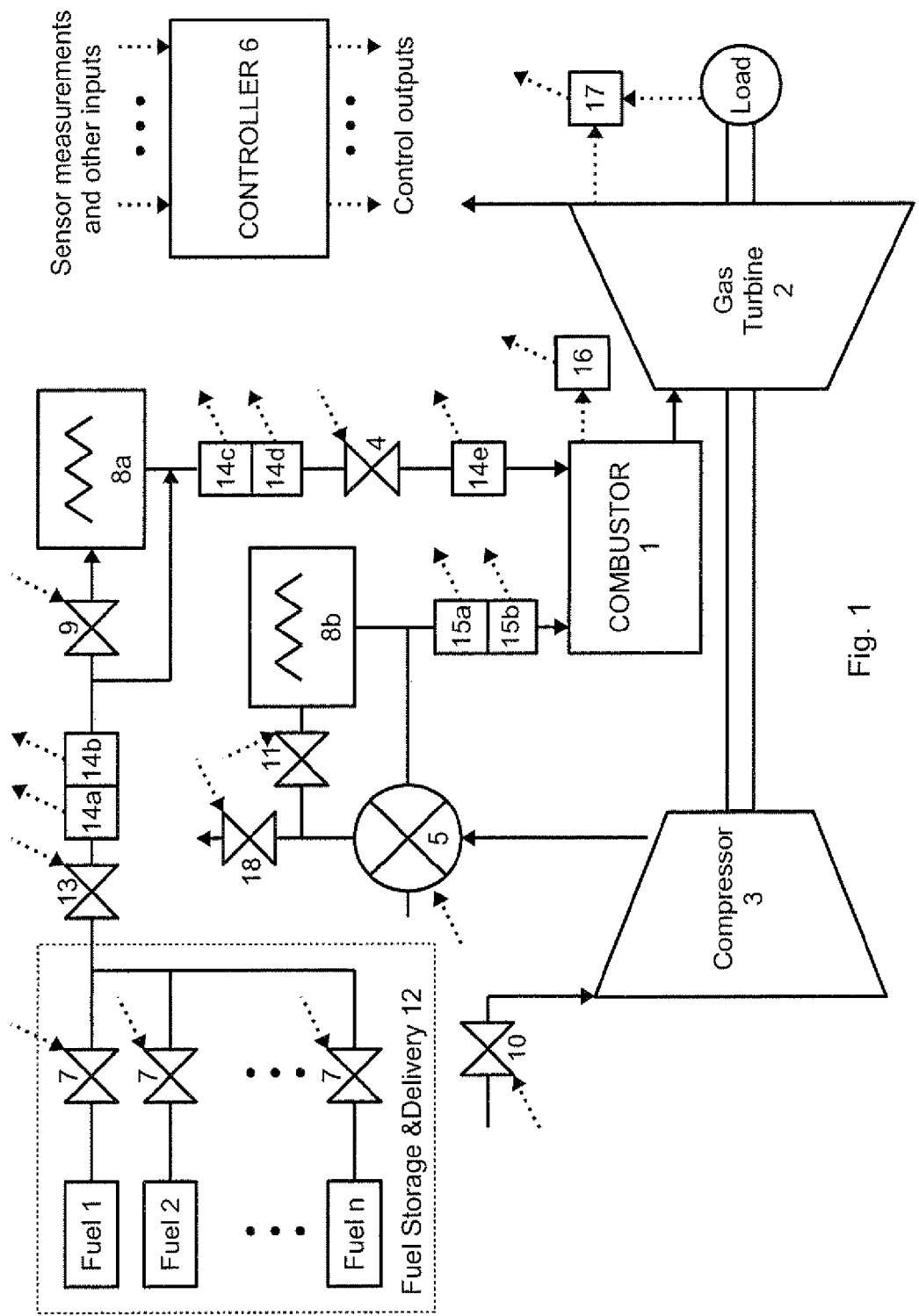
FIG. 1 illustrates an embodiment of a system for delivering fuel and oxidizer mixture to a gas turbine according to a non-limiting aspect of the present invention.

A novel method, system, and apparatus for igniting a gas turbine are described. The described method, system, and apparatus calculate the ignitability of fuel/oxidizer mixture and make necessary adjustments so that the fuel may be ignited. The fuel composition need not be determined prior to the ignition/combustion process. Of particular benefit is that the heat balance of the ignited fuel need not be used.

As mentioned above, it is desirable to be able to operate the gas turbine using a wide quality range of turbine fuels during at different times including ignition and turbine warm-up. The fuel delivered to the gas turbine may be composed of multiple fuel components in a wide range of quality. In general, gaseous fuels, liquid fuels, or both may be combusted in a gas turbine.

In the past, the heating value was used as an indicator of an amount of fuel, which should be provided to the combustor, including ignition at startup to meet the energy requirements. Often, the heating value was used as an indicator of fuel quality—higher heating value usually indicated higher fuel quality.

When a certain quantity of fuel reacts with oxygen to form water, and other products, a fixed amount of energy is liberated, which can be quantified by, for example, the fuel's lower heating value (LHV). While LHV will be primarily used to describe the examples to demonstrate some of the beneficial features of various aspects of the present invention, principles of the invention will be applicable when the energy are considered in terms of HHV or Q or other similar expressions.

There can be a difference between the desired heating value for a turbine, which may be needed to obtain energy for ignition and stable starting, and the actual needs for the supplied fuel to be ignited and to sustain flame propagation during various stages of the turbine starting period. Actual needs for reliable ignition and sustainable flame can be more accurately estimated with an evaluation of another fuel property—the fuel's flammability, also referred to as combustibility. Generally, if the flammability is too low, no ignition and stable combustion will be reached. If the flammability is too high, risk of explosion and high emissions will increase.

For a fire or explosion to occur, fuel, oxygen and an ignition source are required. Also, the fuel and oxygen must be mixed in appropriate quantities. The flammability of a fuel is typically defined in terms of its lower and upper flammability limits (LFL, UFL). The LFL and UFL are respectively, the lowest and highest gas concentration of the fuel relative to air that will support a self-propagating flame when ignited. Below the LFL, the fuel/air mixture is too lean for combustion, i.e. there is not enough fuel. Above the UFL, the mixture is too rich, i.e. there is not enough air.

It is desirable to maintain lean burn operation to reduce NOx emissions. Thus it is desirable to operate the gas turbine with as lean mixture as possible including during ignition. However, the mixture should not be so lean so that a lean blow off (LBO) occurs. As it relates to gas turbines, LBO is a condition in which the flow of fuel is insufficient to maintain combustion. LBO is proportional to LFL, and approaches LFL as a fluid velocity approaches zero.

FIG. 1 is an example system that adjusts fuel and oxidizer delivery to a combustor of a gas turbine to maintain combustion, for example, to obtain safe and stable ignition during a start up the gas turbine. Oxidizer is usually delivered in the form of air, and thus, air will be assumed to be the oxidizer of choice in the descriptions below. However, the invention is not so limited.

As seen in the figure, the system includes a combustor 1 arranged to generate high energy gases to drive a gas turbine 2. A compressor 3 is arranged to provide oxidizer, e.g. air, to the combustor 1, and a fuel valve pump 4 is arranged to control the amount of fuel delivered to combustor 1. The fuel-air mixture can be controlled, at least in part, through controlling the amount of air produced by the compressor 3 and adjusting mechanisms such as the compressor's inlet guide vanes (IGVs), inlet bleed valves, and combustor bypass valves among others. In FIG. 1, an IGV 10 is illustrated.

While the compressed air may be provided directly to the combustor 1, it is preferable that the system includes a three-way valve 5 arranged to control any combination of an amount, pressure, and temperature of air coming to the combustor 1, an amount, pressure, and temperature of returning air to an inlet of the compressor 3, and an amount of air bypassing the combustor 1. An Air Temperature Compressor Discharge (TCD) sensor 15a and an air pressure sensor 15b can be used to measure temperature and pressure of air and temperature and pressure of air-fuel mixture.

The system includes a turbine controller 6. In a non-limiting aspect, the turbine controller 6 controls both the air and the fuel delivery based on the ignitability of the fuel and the fuel-air mixture, which will be described in more detail below. Also as will be described in further detail below, the controller 6 may receive measurements from various sensors as inputs to generate control information as outputs to control the operation of the gas turbine 2. To minimize clutter, signals to and from the controller 6 are represented as dashed arrows in FIG. 1.

In a non-limiting aspect, the controller 6 is arranged to control the delivery of fuel and air supplied to the combustor 1 based on the fuel's ignitability. One of many advantages is that ignitability of the fuel may be determined without igniting the fuel and without knowing the composition of the fuel. In other words, it is not necessary to determine the individual fuel components that make up the fuel as a whole prior to ignition. It is also not necessary directly measure the fuel's calorific value prior to ignition. As such, expensive sensing devices such as Wobbe meter, gas chromatograph, and calorimeter are not necessary. While these types of sensing devices are not necessary, they may be nonetheless be included, e.g. to improve reliability and provide verification.

Instead of relying upon sensing devices that measure calorific values and/or measure fuel components, the fuel properties that affect flow parameters, such as pressure and pressure drop at the specified lift of the fuel delivery valve can be used. Molecular weight is one example of such property. Specific gravity (SG) is another such example. One advantage is that sensors to measure these properties, such as an SG sensor, are relatively inexpensive.

The following is provided as an explanation. Fuel's molecular weight affects both flammability and heat capacity in a predictable manner. For example, for hydrocarbon fuels, higher molecular weight generally corresponds with lower combustible lean limit of flammability. Also, higher molecular weight generally corresponds with higher heat capacity of the fuel. In addition, there is a correlation between lean limit flame temperature and the minimum spark ignition energies.

Flammability of fuels can be estimated or otherwise determined when properties of fuels such as molecular weight or other related properties—e.g. flow rate, density, specific gravity, velocity—are measured and/or calculated at a reference piping geometry and valve openings. When the fuel's molecular weight or other properties related to the molecular weight are defined, the flammability of the fuel, which is a major part of ignitability, can be determined. Based on this information, the ignitability of the fuel can be adjusted to a reference.

The fuel can be composed of different fuel components. In other words, the ignitability of a fuel composition that includes multiple different fuel types can be determined and adjusted. It is not necessary to determine the individual components that make up the whole fuel composition. Lean limit of ignitability—also referred to as minimum ignition energy—can be calculated after the combustible lean limit of the mixture is determined. LL can be viewed as a flammability limit of the mixture below which a lean blow out (LBO) will not be prevented.

The fuel flammability is also closely related to the fuel reactivity. Thus, in many instances, the fuel flammability can be estimated, to a sufficient degree of accuracy, using fuel reactivity definition parameters, such as the reaction rate coefficients, flame temperature, and combustion temperature, ignition delay, and/or blow-off time. Thus, similar to the manner in which the LLI can be calculated based on the flammability of the fuel mixture, the LLI can also be calculated after the reactivity of the fuel is determined.

In addition to the heating value and/or reactivity, ignition energy may be determined by the fuel-air ignitability. There can be a difference between ignitability needed to obtain energy to ignite the turbine combustor and the ignitability of the mixture delivered to the combustor. It is especially important to recognize this difference when the fuel type and/or composition are unknown.

In another aspect, along with determining ignitability of fuel-air mixture with unknown fuel composition, calculations may be performed on the pressure and velocity/turbulence at the moment of ignition for adjustment. To adjust ignitability to a reference value, fuel valve lift may be modulated. Also, the amount of air and/or temperature of the air may be adjusted. Even in a system with multiple sources of various fuels, the ignitability of the fuel may be brought to the desired value. As the fuel and/or fuel-air mixture ignitability is defined, adjustments can also be made to the ignition spark charge, spark duration, spark frequency and/or rotor speed.

Referring back to FIG. 1, the controller 6 may be arranged to adjust the parameters of the fuel and air supplied to the combustor 1 based on the fuel's ignitability. The ignitability of the fuel may be determined based on the fuel's specific gravity (SG). While SG is used primarily in the description below, the invention is not so limited. Some or all fuel properties that affect the flow parameters may be used. Since molecular weight is one of the main properties that affect the flow parameters, molecular weight and/or properties related to the molecular weight may be used to determine the fuel's ignitability.

The system can further include a fuel storage and delivery system 12 arranged to store and/or deliver multiple component fuels in a wide range of quality. The controller 6 may control the delivery of each component fuel by adjusting the openings of valves pumps 7 corresponding to the different component fuels. In other words, the controller 6 may control the blending of the component fuels when multiple component fuels are available.

Optionally, a valve pump 13 may be included which affects the total quantity of the fuel delivered. When included, the controller 6 may control the valve pump 13 to control the fuel flow. Note that the fuel flow can also be controlled through controlling the valves pumps 7 corresponding to individual fuel components.

The system preferably includes sensors that measure the fuel's molecular weight or properties related to the molecular weight such as specific gravity, flow, density, and velocity. For example, the system may include a fuel SG sensor 14a and a fuel flow sensor 14b. The fuel SG sensor 14a is arranged to measure the fuel's specific gravity. The fuel flow sensor 14b is arranged to measure fuel flow parameters such as fuel flow rate (in mass or in volume or both) and the fuel flow velocity. The fuel flow sensor 14b may be a single sensor or a combination of sensors that measure the fuel flow parameters.

The system may also include a fuel heat exchanger 8a to which at least a part of the fuel is diverted under the control of the controller 6 so as to maintain the fuel at a desired temperature or within a desired range of temperatures. For example, the controller 6 may control a valve pump 9 to control the amount of fuel diverted to the fuel heat exchanger 8a. The fuel temperature may be measured by a fuel temperature sensor 14c. The system may further include a fuel pressure sensor 14d for measuring the pressure of the fuel delivered to the combustor 1.

The ignitability of the fuel and/or fuel-air mixture may be adjusted by adjusting any combination of the fuel flow parameters and air flow parameters based on one or more ignitability indicators. Examples of the fuel flow parameters include pressure, pressure drop, temperature, flow rate (mass or volume amount or both), and velocity among others. Examples of air flow parameters include pressure, pressure drop, temperature, and flow rate (mass or volume amount or both) among others.

Preferably, the adjustments are automatically performed by the controller 6 as described below. However, the same adjustments can be manually performed once the ignitability indicators are determined.

The controller 6 can control the operation of the three-way valve 5 to adjust the air flow, pressure and temperature by controlling the amount of air coming to the combustor 1, the amount of returning air to an inlet of the compressor 3, the amount of air bypassing the combustor 1 and so on. The controller 6 can adjust the air pressure by controlling delivery of compressed air from the compressor 3 to the combustor 1.

To adjust the air temperature, the controller 6 may divert at least a part of the air entering the combustor 1 to an air heat exchanger 8b through controlling a valve pump 11 to preheat the diverted air prior to entering the combustor 1. The air temperature may be measured by an air temperature sensor 15a, such as and air temperature compressor discharge sensor, and provided to the controller 6. Note that further air temperature control can also be realized, through an effect known as the inlet bleed heating, by sending at least a part of the compressed air to the compressor inlet via the three-way valve 5. It should also be noted that the fuel and air heat exchangers 8a and 8b can be combined in one module or be provided as separate modules.

Ignitability adjustments may also be made based on measurements other than fuel related measurements. For example, the system may include a sensor 16 to measure or otherwise determine mixing quality of air and fuel mixture (estimated by Da (Damkohler), and/or fluid turbulence. Turbulence can be expressed in Ka (Karlovitz) and/or Re (Reynolds) numbers. The controller 6 may use these measurements to further adjust the fuel and/or air flow parameters so that the fuel-air mixture may be ignited.

As noted many times above, the fuel delivered to the combustor 1 in FIG. 1 can be a composition of one or several individual fuel components, and the delivery of each fuel component can be controlled by opening and closing the valves pumps 7 corresponding to each fuel component. Each component fuel may have different characteristics or parameters such as heat values, specific gravity, flash point, and so on. The characteristics of each individual fuel component need not be known directly or exactly in an advantageous aspect of the present invention. Indeed, it can be that a component fuel such as Fuel 1 or Fuel 2 in the Fuel Storage and Delivery 12 may itself be a composition of different fuel types. But again, since the knowledge of exact composition is not necessary, the advantage becomes very clear.

Figure 2:
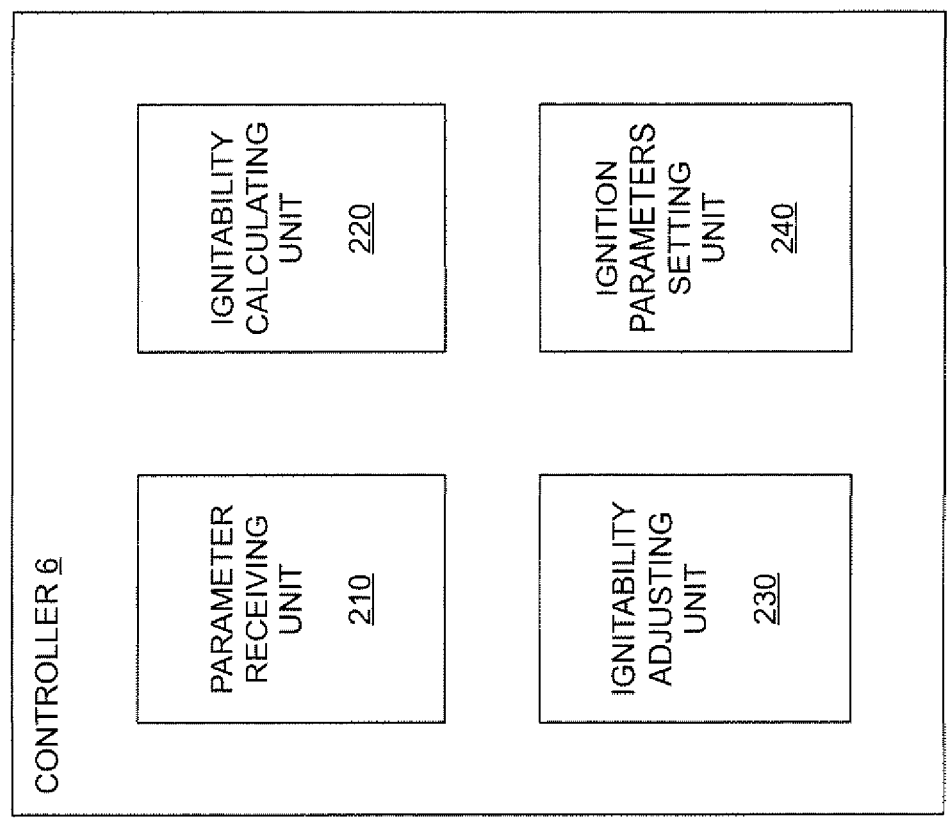
FIG. 2 illustrates an embodiment of a controller arranged to control delivery of fuel and oxidizer mixture to a gas turbine according to a non-limiting aspect of the present invention.

Also in FIG. 1, it is seen that the controller 6 plays an important role in controlling the delivery of fuel-air mixture to the gas turbine 2. FIG. 2 illustrates an embodiment of the controller 6 according to a non-limiting aspect of the present invention. The controller 6 can include a parameter receiving unit 210, an ignitability calculating unit 220, an ignitability adjusting unit 230, and an ignition parameters setting unit 240.

Note that FIG. 2 provides a logical view of the controller 6 and the units included therein. That is to say, it is not strictly necessary that each unit be implemented as a physically separate module. Some or all units may be combined in a physical module. For example, the ignitability calculating unit 220 and the ignitability adjusting unit 230 may be combined in a single module. Moreover, the units need not be implemented in hardware strictly. It is envisioned that the units are implemented through a combination of hardware and software. For example, the actual controller 6 may include one or more central processing units executing non-transitory program instructions stored in a storage medium or in firmware to perform the functions of the units illustrated in FIG. 2.

Figure 3:
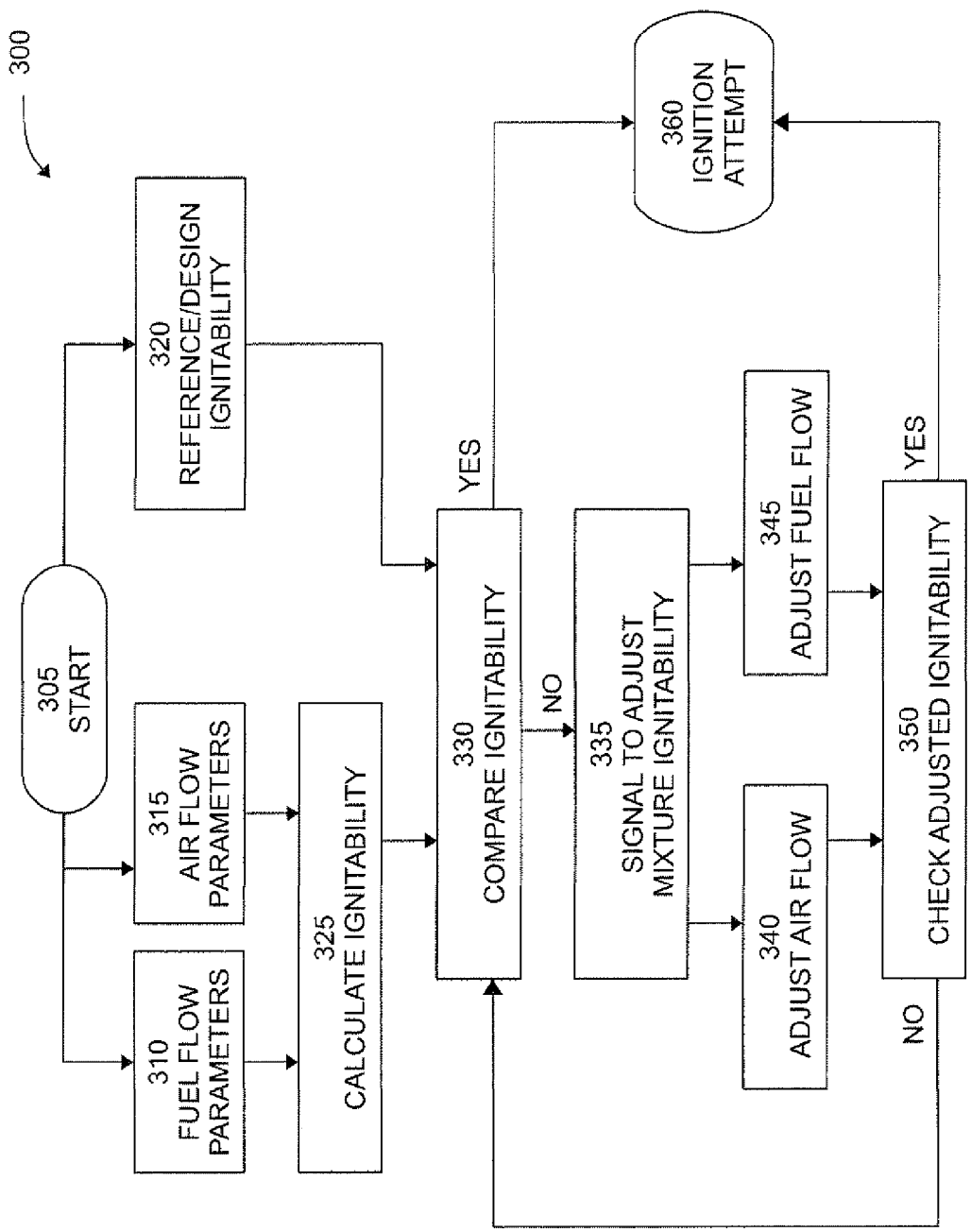
FIG. 3 illustrates a flow chart of an example method for calculating and adjusting ignitability of the fuel prior to actual ignition according to a non-limiting aspect of the present invention.

The roles each unit of the controller 6 plays will be described in conjunction with FIG. 3, which illustrates a flow chart of an example method 300 for delivering fuel-air mixture to the combustor 1 for ignition according to a non-limiting aspect of the present invention. Generally in the method, the fuel and air flow parameters are used to determine ignitability of the mixture. Based on the ignitability, a proper fuel-air mixture that will ignite to start the gas turbine 2 is estimated or otherwise determined.

In one aspect, the fuel's ignitability is calculated based on one or more ignitability indicators. Preferred ignitability indicators of the fuel mixture include the flammability (e.g. LL), heating value (e.g. LHV, HHV, Q), and/or reactivity (e.g. rate of reaction, ignition delay, and blow off). Some of these indicators such LL may be determined if the fuel's calorific value or the individual components of the fuel are known. However, providing sensors to directly measure the calorific value (e.g. Wobbe meter, calorimeter) or measure the individual components (e.g. gas chromatograph) is expensive.

In this aspect of the invention, parameters related to the fuel's molecular weight are measured or otherwise determined. Examples of such parameters include specific gravity, density, flow rate, and velocity among others. Then a transfer function is applied to determine or estimate the flammability, heating value, and/or reactivity of the fuel. That is, the transfer function may be applied to determine the ignitability indicators.

As an example, one or more transfer functions each specifying a relationship between specific gravity, temperature, and combustible lean limit of a fuel mixture can be determined through experiments, empirical observation, and/or through multitude of other ways. The combustible lean limit in this context may be viewed as a flammability limit of the fuel-air mixture, or fuel-oxidizer mixture generically, below which a lean blow out will not be prevented. In one aspect, relationships can be modeled as a second order transfer function expressed in the form of $LL=k(aSG^2-bSG+c)$, in which LL represents the combustible lean limit, SG represents the specific gravity of the fuel, k represents a temperature correction coefficient, and a, b, and c represent correction coefficients.

As another example, one or more transfer functions each specifying a relationship between the specific gravity and the lower heating value of the fuel can be arrived at through experimentation, empirical observation, and other ways. In an aspect, this relationship can be modeled as a linear transfer function expressed in the form of $LHV=-aSG+b$, in which LHV represents the lower heating value of the fuel, SG represents the specific gravity of the fuel, and a and b represent correction coefficients.

Similarly, one or more transfer functions each specifying a relationship between the specific gravity and reactivity of the fuel may be arrived at.

Measuring specific gravities can be very useful as seen above. As noted, while specific gravity is mentioned specifically, transfer functions specifying relationships between any combination of the molecular weight related parameters and the ignitability indicators can be determined and used. One such parameter is the pressure drop. For example, the fuel may be made to flow through a reference piping section with a known geometry. The fuel pressure drop across the reference piping may be determined. For example, fuel pressure sensors 14d may measure the pressure at both the entrance and the exit of the reference piping section. To determine the ignitability indicators, transfer functions that specify relationships between the pressure drop and the ignitability indicators may be applied.

After the ignitability indicators—LL, LHV, and/or rate of reaction—are estimated by applying the transfer functions, the ignitability of the mixture may be calculated. An example of calculated ignitability of the mixture is the lean limit of ignitability, which may also be referred to as the minimum ignition energy, which is the minimum ignition energy required to ignite the mixture. In one aspect, the lean limit flame temperature of the fuel is determined based on the fuel's ignitability indicators such as the fuel's combustible lean limit, and the fuel's lean limit of ignitability can be in turn determined based on the corresponding lean limit flame temperature.

Referring back to FIG. 3, the method 300 starts in step 305. Initially, in steps 310 and 315, the parameter receiving unit 210 may receive fuel flow parameters and air flow parameters measured by sensors. Fuel flow parameters may include fuel pressure, fuel pressure drop, fuel flow rate, fuel flow velocity, and fuel temperature. The fuel flow rate may be the mass flow rate, volume flow rate, or both. Air flow parameters may include air pressure, air pressure drop, air flow rate, air flow velocity, air temperature. In addition, the fuel's molecular weight or parameters related to the molecular weight may be determined. Examples of such related parameters include specific gravity, density, velocity, and flow amount among others.

In step 320, reference/designed ignitability range is determined. This may be preconfigured in the controller 6, provided to the controller 6 from an external source, and/or manually entered in the controller 6.

In step 325, the ignitability calculating unit 220 may calculate the ignitability of the fuel-air mixture based on the above-described parameters. It is important to note that even when the fuel's composition is unknown, the mixture's ignitability can be calculated without first igniting the mixture. Therefore, it is not necessary to directly measure the fuel's calorific value or Wobbe index. It is also not necessary to directly determine the fuel's composition.

Instead, the ignitability calculating unit 220 may determine one or more ignitability indicators based on, at least in part, the molecular weight or related parameter such as the specific gravity. Ignitability indicators are those parameters of the fuel related to the fuel's flammability, the fuel's heat capacity, and/or the fuel's reactivity. Examples include the combustible lean limit, the lower heating value, and rate of reaction.

FIG. 4 illustrates a non-limiting example process to perform step 325. As seen, the ignitability calculating unit 220 may determine the ignitability indicators through applying transfer functions in step 410. As indicated above, one transfer function can model the relationship between the specific gravity of the fuel, the temperature of the mixture, and the combustible lean limit of the mixture. Another transfer function can model a relationship between the specific gravity of the fuel and the lower heating value of the fuel. Yet another transfer function can model a relationship between the specific gravity of the fuel and the rate of reaction. Similarly, transfer functions can model the relationships between the fuel's pressure drop across a reference piping section with the same or different ignitability indicators. These are but a few of many transfer functions that may be applied to determine the ignitability indicators based on the specific gravity, pressure drop, or any other molecular weight related parameters.

Still further, the ignitability calculating unit 220 may determine the ignitability of the mixture based on the one or more ignitability indicators in step 420. For example, in step 420, the lean limit of ignitability may be determined based on the ignitability indicators determined in step 410 and provided as the calculated ignitability.

Referring back to FIG. 3, in step 330, the adjusting unit 230 may determine whether the calculated ignitability of the mixture is acceptable by comparing the calculated ignitability with designed/reference ignitability range. For example, the reference ignitability range may specify an acceptable lean limit of ignitability range. As another example, the reference may specify acceptable ranges for any combination of one or more flammability indicators (e.g. combustible lean limit), one or more heating value indicators (e.g. lower heating value, upper heating value), and/or one or more reactivity indicators (e.g. rate of reaction, ignition delay, blow off time). If the calculated ignitability compares favorably in step 330, the method may end at step 360, at which point, the turbine ignition may be attempted.

On the other, if the calculated ignitability does not compare favorably in step 330, then the adjusting unit 220 may adjust the ignitability of the fuel-air mixture by adjusting the fuel and air flow parameters in steps 335, 340, and 345. In step 350, the adjusting unit 230 may check whether the adjusted ignitability is within the reference ignitability range or ranges. If so, the method may end at step 360, at which point the turbine ignition may be attempted. Otherwise, the process may repeat to further adjust the fuel and air parameters such that the ignitability falls within the reference ignitability range or ranges. Note that in the method, the calculating and adjusting steps are all performed before the ignition is attempted.

While fuel ignition is not required to calculate and/or adjust the ignitability of the mixture, the fuel and air should flow so that the respective flow parameters may be measured. One way is to rotate the gas turbine to a predetermined speed so that fuel and air may flow through respective fuel and air delivery piping.

A second way is to use pumps fluidly attached to the fuel and air delivery piping to generate the necessary fuel and air flow to enable measurements to take place. This second way is advantageous in that the gas turbine, which can have substantial mass, need not be rotated. Referring back to FIG. 1, some or all valves may also serve as active pumps controllable by the controller 6.

Also while not required, if the fuel's calorific values and/or the fuel components can be determined through sensors such as the Wobbe meter, calorimeter, and gas chromatograph, the ignitability adjusting unit 230 may perform the adjustments step of controlling the fuel and air flow parameters based, at least in part, on the measurements from these sensors.

Note that combustibility lean limit affects the minimum fuel setting for first ignition attempt. If any less fuel is provided, lean blow out is likely to occur. However, a maximum fuel setting should also be determined for the first ignition attempt so that a risk of explosion is minimized. The maximum fuel setting can be determined based on a companion combustible rich limit correction. In one aspect, the adjusting unit of the controller may determine the minimum and maximum fuel settings respectively with combustible lean limits correction and combustible rich limits correction.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method performed by a controller for delivering fuel-oxidizer mixture to a gas turbine for ignition, wherein the fuel is a composition of one or more fuel components, the method comprising:

calculating an ignitability of the mixture based on one or more fuel parameters related to molecular weight of the fuel, one or more fuel flow parameters, and one or more oxidizer flow parameters; and adjusting the fuel and oxidizer in mixture such that the ignitability of the mixture after the adjustment is within a reference ignitability range, wherein the step of calculating the ignitability of the mixture and the step of adjusting the fuel and oxidizer mixture are performed before igniting the mixture, wherein the step of calculating the ignitability of the mixture is performed without directly measuring a Wobbe index and calorific value of the fuel, and without directly measuring a composition of the fuel, wherein the step of calculating the ignitability of the mixture comprises:
  determining a specific gravity of the fuel, determining a pressure drop across a predetermined reference piping section, or both;
  determining one or more ignitability indicators of the fuel based on the specific gravity of the fuel, the pressure drop, or both; and
  determining a lean limit of ignitability based on the one or more ignitability indicators,
wherein the ignitability indicators of the fuel include parameters related to a flammability, heat capacity, and/or reactivity of the fuel, and
wherein the lean limit of ignitability is a minimum ignition energy required to ignite the mixture.

2. The method of claim 1, wherein the step of determining the specific gravity of the fuel comprises:
  determining the specific gravity based on measurements from any one or more of a fuel specific gravity sensor and a fuel pressure sensor.

3. The method of claim 1, wherein the step of determining one or more ignitability indicators includes determining a combustible lean limit of the mixture by applying a transfer function that models a relationship between the specific gravity of the fuel and/or the pressure drop, the temperature of the mixture, and the combustible lean limit of the mixture, the combustible lean limit being a flammability limit of the mixture below which a lean blow out will not be prevented.

4. The method of claim 1, wherein the step of determining one or more ignitability indicators include determining a lower heating value of the mixture by applying a transfer function that models a relationship between the specific gravity of the fuel and/or the pressure drop and the lower heating value of the fuel.

5. The method of claim 1, wherein the step of determining one or more ignitability indicators include determining a rate of reaction of the mixture by applying a transfer function that models a relationship between the specific gravity of the fuel and/or the pressure drop and the rate of reaction of the fuel.

6. The method of claim 1, wherein the step of determining the lean limit of ignitability comprises:
  determining a lean limit flame temperature of the fuel based on the one or more ignitability indicators; and
  determining the lean limit of ignitability based on the lean limit flame temperature corresponding to the lean limit of ignitability.

7. The method of claim 1,
wherein the fuel flow parameters include fuel pressure, fuel pressure drop, fuel flow rate, fuel flow velocity, and fuel temperature,
wherein the oxidizer flow parameters include oxidizer pressure, oxidizer pressure drop, oxidizer flow rate, oxidizer flow velocity, oxidizer temperature, and
wherein the step of adjusting the fuel and oxidizer in the mixture comprises controlling any combination of the fuel flow parameters, the oxidizer flow parameters, and turbulence.

8. The method of claim 7, wherein the step of adjusting the fuel and oxidizer in the mixture comprises controlling the fuel flow parameters, the oxidizer flow parameters, or both based on measurements from a fuel composition sensor, a fuel calorific value sensor, or both.

9. The method of claim 1, further comprising setting one or more gas turbine ignition parameters based on one or both of the ignitability of the mixture and the lean limit of ignitability, wherein the gas turbine ignition parameters include spark ignition duration, spark ignition frequency, and rotor speed.

10. The method of claim 1, further comprising determining a minimum fuel setting for a first ignition attempt with combustible lean limits correction, and a maximum fuel setting for the first ignition attempt with combustible rich limits correction.

11. The method of claim 1, wherein the step of calculating the ignitability of the mixture comprises rotating the gas turbine to a predetermined speed to enable measurements of the fuel parameters related to the molecular weight of the fuel, the fuel flow parameters, and the oxidizer flow parameters.

12. The method of claim 1, wherein the step of calculating the ignitability of the mixture comprises:
  pumping the fuel using one or more fuel pumps fluidly attached to fuel delivery piping, to enable measurements of the fuel parameters related to the molecular weight of the fuel and the fuel flow parameters; and
  pumping the oxidizer using one or more oxidizer pumps fluidly attached to oxidizer delivery piping, to enable measurements of the oxidizer flow parameters,
wherein when the fuel and oxidizer are pumped using the fuel and oxidizer pumps, the turbine is not rotated.

13. The method of claim 7, wherein the step of adjusting the fuel and oxidizer in the mixture comprises controlling the fuel flow parameters, the oxidizer flow parameters, or both without directly measuring the Wobbe index, the calorific value of the fuel, and the composition of the fuel.

14. A controller configured to control delivery of fuel and oxidizer mixture to a gas turbine for ignition, wherein the fuel is a composition of one or more fuel components, the controller comprising:
  a parameter receiving unit arranged to receive any combination of on one or more fuel parameters related to molecular weight of the fuel, one or more fuel flow parameters, and one or more oxidizer flow parameters;
  an ignitability calculating unit arranged to calculate an ignitability of the mixture based on parameters received by the parameter receiving unit; and
  an ignitability adjusting unit arranged to adjust the fuel and oxidizer in the mixture such that the ignitability of the mixture after the adjustment is within a reference ignitability range,
wherein the ignitability calculating unit performs the calculation and the ignitability adjusting unit performs the adjustment before the mixture is ignited so as to reduce a number of ignition attempts,
wherein the ignitability calculating unit calculates the ignitability of the mixture without information on a Wobbe index, calorific value, and composition of the fuel,
wherein the ignitability calculating unit calculates the ignitability of the mixture by:
  determining one or more ignitability indicators based on a specific gravity of the fuel, a pressure drop of the fuel across a predetermined reference piping section, or both, and
  determining a lean limit of ignitability based on the one or more ignitability indicators,
wherein the ignitability indicators of the fuel include parameters related to a flammability, heat capacity, and/or reactivity of the fuel, and
wherein the lean limit of ignitability is a minimum ignition energy required to ignite the mixture.

15. The controller of claim 14, wherein the ignitability calculating unit is configured to determine the specific gravity based on measurements from any one or more of a fuel specific gravity sensor and a fuel pressure sensor.

16. The controller of claim 14, wherein the ignitability calculating unit is configured to determine a combustible lean limit of the mixture by applying a transfer function that models a relationship between the specific gravity of the fuel and/or the pressure drop, the temperature of the mixture, and the combustible lean limit of the mixture, the combustible lean limit being a flammability limit of the mixture below which a lean blow out will not be prevented.

17. The controller of claim 14, wherein the ignitability calculating unit is configured to determine a lower heating value of the mixture by applying a transfer function that models a relationship between the specific gravity of the fuel and/or the pressure drop and the lower heating value of the fuel.

18. The controller of claim 14, wherein the ignitability calculating unit is configured to determine a rate of reaction of the mixture by applying a transfer function that models a relationship between the specific gravity of the fuel and/or the pressure drop and the rate of reaction of the fuel.

19. The controller of claim 14, wherein the ignitability calculating unit is configured to determine the lean limit of ignitability by:
   determining a lean limit flame temperature of the fuel based on the one or more ignitability indicators; and
   determining the lean limit of ignitability based on the lean limit flame temperature corresponding to the lean limit of ignitability.

20. The controller of claim 14,
   wherein the fuel flow parameters include fuel pressure, fuel pressure drop, fuel flow rate, fuel flow velocity, and fuel temperature,
   wherein the oxidizer flow parameters include oxidizer pressure, oxidizer pressure drop, oxidizer flow rate, oxidizer flow velocity, oxidizer temperature, and
   wherein the ignitability adjusting unit is configured to adjust the fuel and oxidizer in the mixture by controlling any combination of the fuel flow parameters, the oxidizer flow parameters, and turbulence.

21. The controller of claim 20, wherein the ignitability adjusting unit is configured to adjust the fuel and oxidizer in the mixture by controlling the fuel flow parameters, oxidizer flow parameters, or both based on measurements from a fuel composition sensor, a fuel calorific value sensor, or both.

22. The controller of claim 14, further comprising an ignition parameters setting unit configured to set one or more gas turbine ignition parameters based on one or both of the ignitability of the mixture and the lean limit of ignitability,
   wherein the gas turbine ignition parameters include spark ignition duration, spark ignition frequency, and rotor speed.

23. The controller of claim 14, wherein the ignition parameters setting unit is configured to control a minimum fuel setting for a first ignition attempt with combustible lean limits correction, and a maximum fuel setting for the first ignition attempt with combustible rich limits correction.

24. The controller of claim 20, wherein the ignitability adjusting unit is configured to adjust the fuel and oxidizer in the mixture by controlling the fuel flow parameters, oxidizer flow parameters, or both without information on a Wobbe index, calorific value, and composition of the fuel.

* * * * *